(12) United States Patent
Hirukawa

(10) Patent No.: US 7,984,780 B2
(45) Date of Patent: Jul. 26, 2011

(54) RADIATOR GRILLE MOUNTING STRUCTURE

(75) Inventor: Masayuki Hirukawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 406 days.

(21) Appl. No.: 12/199,962

(22) Filed: Aug. 28, 2008

(65) Prior Publication Data
US 2009/0058141 A1 Mar. 5, 2009

(30) Foreign Application Priority Data

Aug. 31, 2007 (JP) ................................. 2007-226534

(51) Int. Cl.
*B60R 19/52* (2006.01)
(52) U.S. Cl. ..................................... 180/68.6; 180/68.4
(58) Field of Classification Search ................ 180/68.6, 180/69.24, 218, 225, 68.4, 198; 296/193.09, 296/193.11
See application file for complete search history.

(56) References Cited

U.S. PATENT DOCUMENTS

| | | | |
|---|---|---|---|
| 5,984,035 A * | 11/1999 | Katoh et al. ................. | 180/68.1 |
| 6,102,144 A * | 8/2000 | Lutz ............................ | 180/65.25 |
| 6,405,819 B1 * | 6/2002 | Ohkura et al. ............... | 180/68.1 |
| 7,231,996 B2 * | 6/2007 | Karube et al. ............. | 180/69.24 |
| 7,762,367 B2 * | 7/2010 | Yamaguchi et al. ......... | 180/68.1 |
| 2008/0157566 A1* | 7/2008 | Tazaki et al. ................ | 296/193.1 |

FOREIGN PATENT DOCUMENTS

| | | |
|---|---|---|
| JP | 2004-243992 A | 9/2004 |
| JP | 2009-241872 | * 10/2009 |

* cited by examiner

*Primary Examiner* — J. Allen Shriver, II
*Assistant Examiner* — James Triggs
(74) *Attorney, Agent, or Firm* — Birch, Stewart, Kolasch & Birch, LLP

(57) ABSTRACT

A radiator grille mounting structure for facilitating the mounting of a radiator grille. A radiator grille is mounted on part of a vehicle body frame. The radiator grille is rotated about the part of the vehicle body frame. A support portion included on the radiator grille is connected to a vehicle body cover.

20 Claims, 12 Drawing Sheets

RADIATOR GRILLE MOUNTING STRUCTURE

CROSS-REFERENCE TO RELATED APPLICATIONS

The present application claims priority under 35 USC 119 to Japanese Patent Application No. 2007-226534 filed on Aug. 31, 2007 the entire contents of which are hereby incorporated by reference.

BACKGROUND OF THE INVENTION

1. Field of the Invention

The present invention relates to a radiator grille mounting structure for a vehicle having a water-cooled engine.

2. Description of Background Art

A saddle-riding type vehicle, such as an ATV (all terrain vehicle), normally includes a radiator grille disposed forward of a radiator which, in turn, is disposed forward of a water-cooled engine mounted on a vehicle body frame. A vehicle of the foregoing type has a radiator grille attached to a stay fixed to the vehicle body frame and to a vehicle body cover. See, for example, Japanese Patent Laid-open No. 2004-243992.

The radiator grille disclosed in Japanese Patent Laid-open No. 2004-243992 is divided into three parts. More specifically, a center grille, a left grille, and a right grille. A shaft portion extends vertically and is disposed at each of four corners of each of the three grilles. The shaft portions are fitted vertically into a plurality of grommets disposed on the stay and the vehicle body cover, so that the radiator grille is installed in place.

However, a problem exists in that a mounting direction of the radiator grille is oriented vertically. Thus, it is cumbersome to mount the radiator grille. Such a problem needs to be solved particularly in vehicles like an ATV or the like, in which a steering shaft for steering a front wheel and the like restricts the space for disposing the radiator grille.

SUMMARY AND OBJECTS OF THE INVENTION

The present invention has been made to solve the foregoing problem and it is desirable to provide a radiator grille mounting structure facilitating the mounting of the radiator grille.

To solve the foregoing problem, according to an embodiment of the present invention, there is provided a radiator grille mounting structure for a vehicle having an engine and a radiator disposed on a vehicle body frame with a radiator grille disposed forward of the radiator. The radiator grille mounting structure includes the radiator grille mounted on part of the vehicle body frame with the radiator grille being rotated about the part of the vehicle body frame. A support portion included in the radiator grille is connected to a vehicle body cover.

In accordance with an embodiment of the present invention, the radiator grille is mounted on the part of the vehicle body frame with the radiator grille being rotated about the part of the vehicle body frame. The support portion included in the radiator grille is connected to the vehicle body cover. This arrangement allows the radiator grille to be mounted through a simple procedure of mounting and rotating the radiator grille on the part of the vehicle body frame.

In the foregoing arrangement, preferably the part of the vehicle body frame includes a pair of frames extending vertically on both sides of a steering shaft for steering front wheels and the radiator grille is fitted to the frames. This allows the radiator grille to be mounted easily even if the degree of freedom in the positional adjustment of the radiator grille is restricted by the steering shaft or frame.

In the foregoing arrangement, preferably the radiator grille includes a pair of left and right halves, each being independently attached to a corresponding one of the pair of frames. This helps make even smaller the space requirements for mounting of the radiator grille.

In the foregoing arrangement, preferably the radiator grille extends across the vehicle body frame and the radiator. This allows the radiator grille to protect the area appropriate to the radiator.

In the foregoing arrangement, preferably the vehicle body cover includes a recess disposed on an inside thereof; and a protrusion of the radiator grille is fitted into the recess when the radiator grille is rotated. This allows the radiator grille and the vehicle body cover to be easily connected together through the rotation of the radiator grille.

Preferably, the recess in the vehicle body cover is open to a front side of a vehicle body, and the protrusion of the radiator grille is guided along a guide groove open to the front side into the recess. This allows the radiator grille to be automatically adjusted for a correct position by means of the guide groove, further facilitating the mounting of the radiator grille.

In the foregoing arrangement, preferably, when the radiator grille is rotated about the vehicle body frame, the radiator grille is connected to a distal portion of the vehicle body frame. This allows the radiator grille to be connected also to the distal portion of the vehicle body frame through the rotation of the radiator grille. Accordingly, the support strength of the radiator grille can be improved, while keeping the radiator grille mounting procedure easy.

Preferably, the distal portion of the vehicle body frame includes a flange having an opening, and the protrusion on the radiator grille is fitted into the opening in the flange. This allows the radiator grille to be supported on the vehicle body frame via the flange.

In accordance with an embodiment of the present invention, the radiator grille is mounted on the part of the vehicle body frame with the radiator grille being rotated about the part of the vehicle body frame. The support portion included in the radiator grille is connected to the vehicle body cover. The radiator grille can therefore be mounted easily.

In addition, the part of the vehicle body frame includes a pair of frames extending vertically on both sides of the steering shaft for steering the front wheels and the radiator grille is fitted to the frames. This allows the radiator grille to be mounted easily even if the degree of freedom in the positional adjustment of the radiator grille is restricted by the steering shaft or frame.

Further, the radiator grille includes a pair of left and right halves, each being independently attached to a corresponding one of the pair of frames. This helps make even smaller space requirements for mounting of the radiator grille.

Further, the radiator grille extends across the vehicle body frame and the radiator. This allows the radiator grille to protect the area appropriate to the radiator.

Further, the vehicle body cover includes the recess disposed on the inside thereof, and the protrusion of the radiator grille is fitted into the recess when the radiator grille is rotated. This allows the radiator grille and the vehicle body cover to be easily connected together through rotation of the radiator grille.

Further, the recess in the vehicle body cover is open to the front side of the vehicle body, and the protrusion of the radiator grille is guided along the guide groove open to the front side into the recess. This allows the radiator grille to be automatically adjusted for a correct position by means of the guide groove, further facilitating the mounting of the radiator grille.

Further, when the radiator grille is rotated about the vehicle body frame, the radiator grille is connected to the distal portion of the vehicle body frame. This allows the radiator grille to be connected also to the distal portion of the vehicle body frame through the rotation of the radiator grille. Accordingly, the support strength of the radiator grille can be improved, while keeping the radiator grille mounting procedure easy.

Further, the distal portion of the vehicle body frame includes the flange having an opening, and the protrusion on the radiator grille is fitted into the opening in the flange. This allows the radiator grille to be supported on the vehicle body frame via the flange.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6(*b*) is a view on arrow A of FIG. 6(*a*);

FIG. 12(*b*) is a side cross-sectional view showing the connection portion between the tank underside cover and the seat underside cover.

DETAILED DESCRIPTION OF THE PREFERRED EMBODIMENTS

Figure 1:
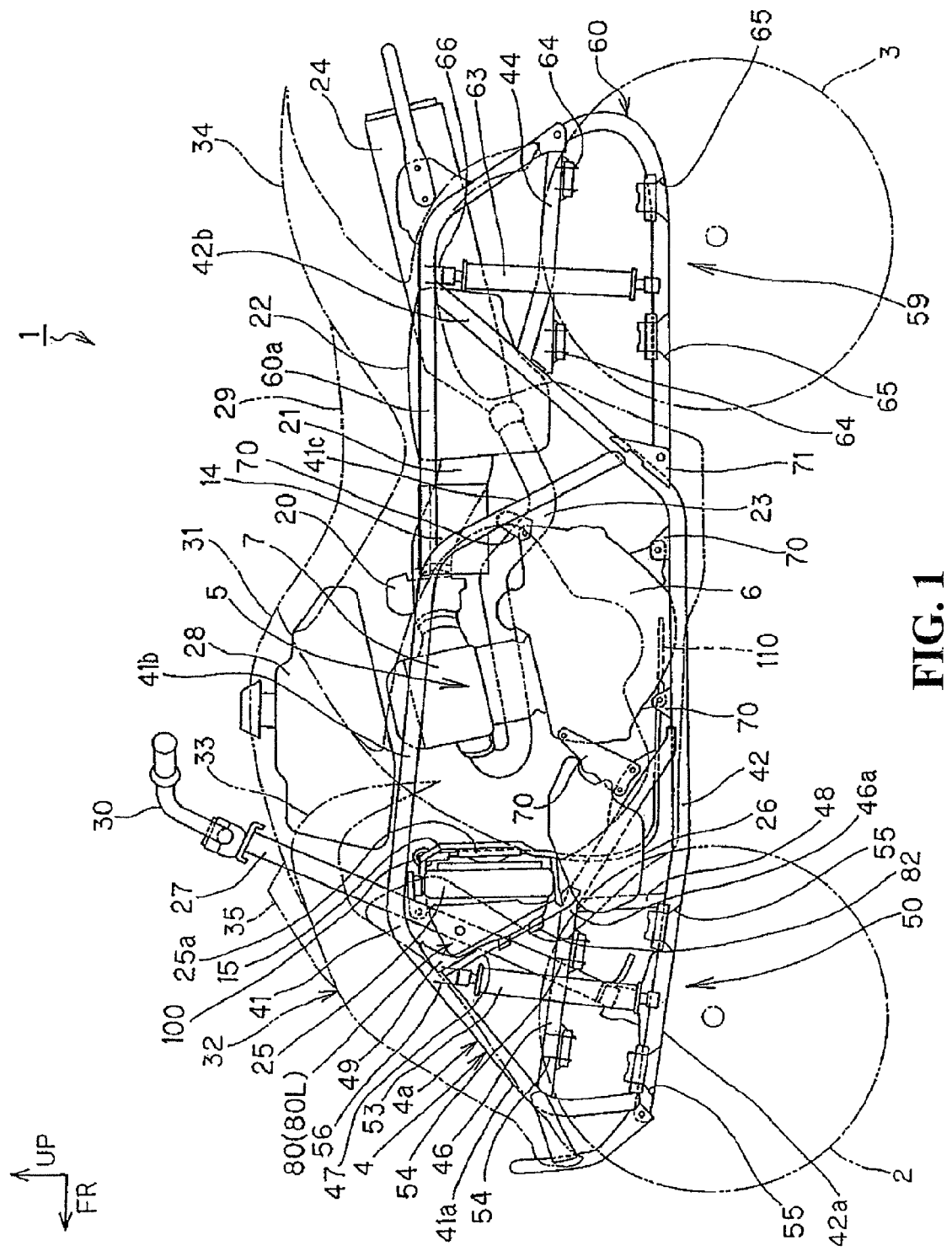
FIG. 1 is a side elevational view showing a saddle-riding type vehicle according to an embodiment of the present invention.

A specific embodiment to which the present invention is applied will be described below with reference to the accompanying drawings. Throughout the descriptions given hereunder, longitudinal, lateral, and vertical directions are relative to the vehicle body. In the drawings, an arrow FR denotes a vehicle forward direction, an arrow R denotes a vehicle rightward direction, and an arrow UP denotes a vehicle upward direction, respectively.

As illustrated in FIG. 1, a saddle-riding type vehicle 1 is a four-wheel vehicle categorized as an ATV (all terrain vehicle). The saddle-riding type vehicle 1 includes left and right front wheels 2 and rear wheels 3, each having a relatively large diameter, disposed at the front and rear of a compact and lightweight vehicle body. The vehicle 1 has a sufficient ground clearance to enhance operation on rough roads.

Referring to FIG. 1, the saddle-riding type vehicle 1 has a vehicle body frame 4. The left and right front wheels 2 are suspended via a front suspension 50 on a front portion of the vehicle body frame 4. The left and right rear wheels 3 are suspended via a rear suspension 59 on a rear portion of the vehicle body frame 4.

Figure 2:
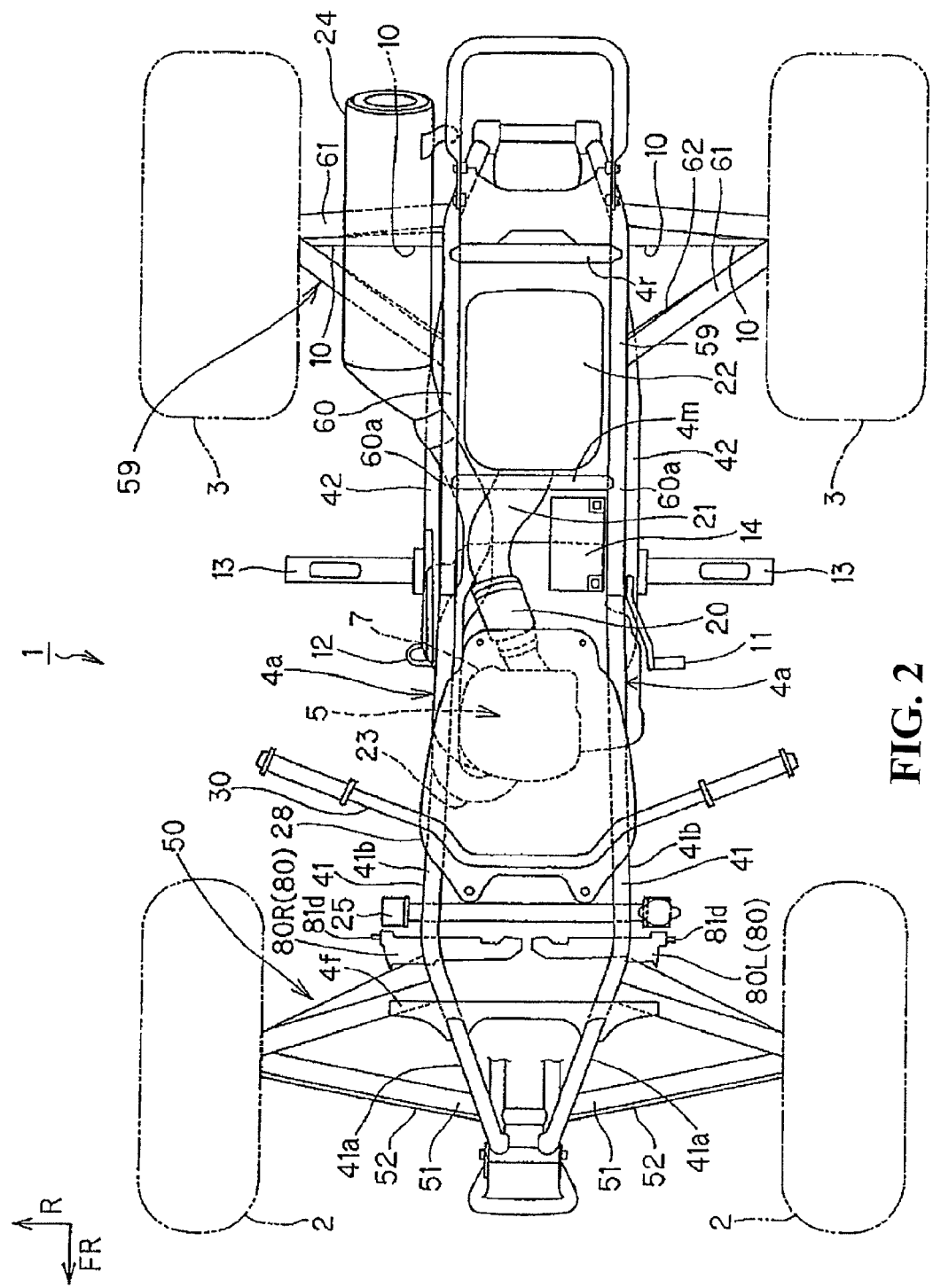
FIG. 2 is a plan view showing the saddle-riding type vehicle according to the embodiment of the present invention.

The vehicle body frame 4 has an engine (water-cooled engine) 5 supported at a substantially center portion thereof via a plurality of engine mounts 70. A throttle body 20 is connected to a rear portion of a cylinder 7 of the engine 5. An air cleaner case 22 is connected to a rear portion of the throttle body 20 via a connecting tube 21. The throttle body 20, the connecting tube 21, and the air cleaner case 22 constitute an intake system of the engine 5. An exhaust pipe 23 is connected to a front portion of the cylinder 7 of the engine 5. Referring to FIG. 2, the exhaust pipe 23 extends forwardly of the cylinder 7 and bends to the right of the vehicle body and folds back toward the rear. The exhaust pipe 23 then extends rearwardly along the right side of the cylinder 7 and is connected to a muffler 24 disposed at a rear portion of the vehicle body. The exhaust pipe 23 and the muffler 24 constitute an exhaust system of the engine 5. Referring to FIG. 2, a shift pedal 11, a brake pedal 12, footpegs 13, 13, and a battery 14 are provided.

Figure 3:
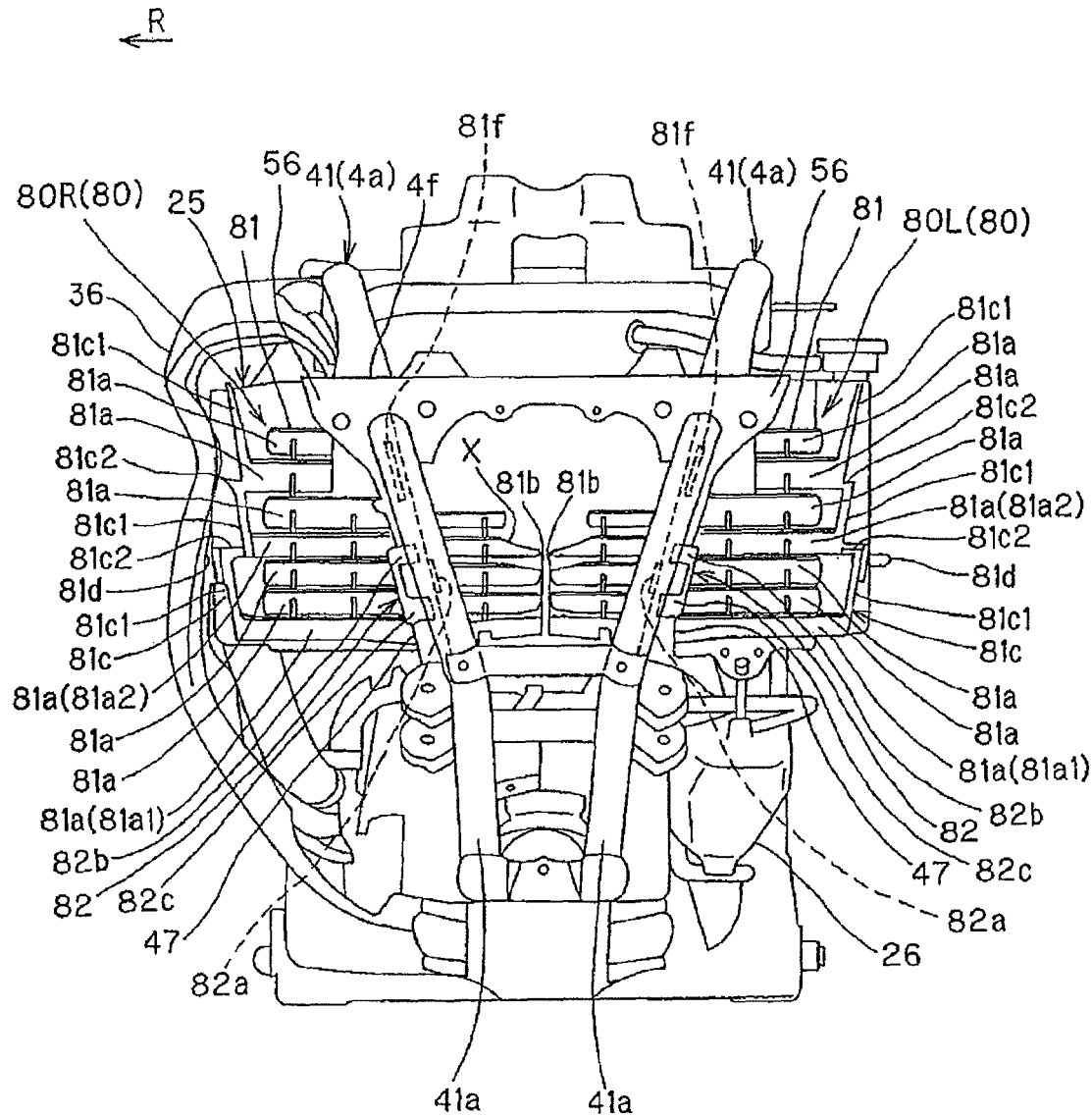
FIG. 3 is a front view showing the saddle-riding type vehicle according to the embodiment of the present invention.

Referring to FIGS. 1 and 3, a radiator 25 for cooling the engine 5 is disposed forward of the engine 5. The radiator 25 is connected to the engine 5 via a rubber coolant pipe. The radiator 25 cools, with a flow of air blown thereagainst from a forward direction of the vehicle, coolant supplied from the engine 5 and returns the cooled coolant back to the engine 5. A blower fan 25*a* (FIG. 1) is disposed on a back surface of the radiator 25. The blower fan 25*a* forces outside air to the radiator 25, so that the coolant can be cooled. A reservoir tank 26 (FIG. 3) for storing the coolant is disposed downward of the radiator 25 (downward and on the left-hand side of the radiator 25 according to the embodiment of the present invention). The reservoir tank 26 is connected to the radiator 25 via the rubber coolant pipe.

The engine 5 includes a crankcase 6 and the cylinder 7. The crankcase 6 rotatably supports a crankshaft and the like. The cylinder 7 is connected on top of the crankcase 6. The crankcase 6 serves also as a transmission case accommodating therein a transmission. The crankcase 6 has an output shaft connected to the transmission inside the crankcase 6. Rotation of the output shaft is transmitted to a final gear case (not shown) in a rear portion of the vehicle body frame 4 via a chain drive mechanism not shown. The rear wheels 3 are thereby rotatably driven via a drive shaft 10 (FIG. 2) extending laterally from the final gear case.

Referring to FIG. 1, a steering shaft 27, which steers the front wheels 2, 2, a fuel tank 28, and a saddle-riding type seat 29 are disposed in that order from the front side at a center in a vehicle width direction at an upper portion of the vehicle body frame 4. A handlebar 30 is fitted to an upper end of the steering shaft 27. The handlebar 30 is disposed obliquely upwardly toward the front of the fuel tank 28. The steering shaft 27 has a lower end connected to a steering mechanism, via which the front wheels 2, 2 are steered through the handlebar 30.

The fuel tank 28 is disposed above the engine 5. Fuel in the fuel tank 28 is supplied to an injector (not shown) disposed in the throttle body 20 by way of a fuel pump not shown. The injector supplies fuel into the engine 5.

The saddle-riding type seat 29 extends longitudinally along the vehicle body. The seat 29 has a front end fixed to a tank cover 31 covering an upper portion of the fuel tank 28. Further, the seat 29 has a rear lower end fixed to a cross member 4m of the vehicle body frame 4.

The vehicle body frame 4 is fitted with a vehicle body cover 32, a front fender 33, and a rear fender 34. The vehicle body cover 32 formed of a resin covers the vehicle body. The front fender 33 formed of a resin covers the two front wheels 2 from above rearwardly. The rear fender 34 formed of a resin covers the two rear wheels 3 from a forward end thereof upwardly. The vehicle body cover 32 includes a top cover 35 and a pair of left and right side covers 36 (see FIG. 3—also referred to as "shrouds"). The top cover 35 covers the front portion of the vehicle body. The side covers 36 cover left and right parts of the front portion of the vehicle body (more particularly, the left and right parts of the fuel tank 28 and the radiator 25). It is to be noted that FIG. 3 shows a condition, in which the side cover 36 on the right-hand side of the vehicle body is fitted, while the side cover 36 on the left-hand side of the vehicle body is removed.

Referring to FIG. 2, the vehicle body frame 4 includes a pair of left and right main frames 4a, 4a and a pair of left and right sub-frames 60, 60. The main frames 4a, 4a extend substantially longitudinally along the vehicle body The sub-frames 60, 60 are connected to rear portions of the main frames 4a, 4a. The main frames 4a, 4a are formed from steel of a plurality of types (tubular pipe frames (round pipe frames)) that are welded together. Having a pair of left and right upper pipes 41, 41 and a pair of left and right lower pipes 42, 42 as main members, the main frames 4a, 4a form a pair of left and right closed loop structural bodies. These members are joined together by a plurality of cross members 4f, 4m, 4r, and the like to form a box structure having a longer longitudinal length at the center in the vehicle width direction.

Referring to FIGS. 1 and 2, the pair of left and right upper pipes 41, 41 includes front inclined portions 41a, 41a, intermediate portions 41b, 41b, and rear inclined portions 41c, 41c. The front inclined portions 41a, 41a extend rearwardly along the vehicle body, extend obliquely upwardly from front ends thereof and gradually widening a mutual gap therebetween. The intermediate portions 41b, 41b extend rearwardly along the vehicle body, extend downwardly with a mild inclination from rear ends of the front inclined portions 41a, 41a and maintaining a substantially constant gap therebetween. The rear inclined portions 41c, 41c extend rearwardly along the vehicle body, extend downwardly with a steep inclination from rear ends of the intermediate portions 41b, 41b and maintaining a substantially constant gap therebetween. Each of these members is formed by bending a single steel pipe.

The pair of left and right sub-frames 60, 60 is connected to a boundary between the intermediate portions 41b, 41b and the rear inclined portions 41c, 41c of the upper pipes 41, 41. Each of the sub-frames 60, 60 extends rearwardly substantially horizontally before being bent downwardly in the rear of the vehicle body. The sub-frame 60 is then formed into a letter C in a side view. The sub-frame 60 then has a leading end thereof connected to each of the pair of left and right lower pipes 42, 42.

Horizontally extending portions 60a, 60a of the sub-frames 60, 60 serve also as seat rails. The abovementioned cross member 4m serving also as a support member supporting a rear end of the seat 29 is disposed at the horizontally extending portions 60a, 60a.

Referring to FIG. 1, the pair of left and right lower pipes 42, 42 includes horizontal portions 42a, 42a and rear inclined portions 42b, 42b. The horizontal portions 42a, 42a extend longitudinally along the vehicle body under the upper pipes 41, 41. Connected to the front inclined portions 41a, 41a of the upper pipes 41, 41, the horizontal portions 42a, 42a extend rearwardly substantially horizontally. The rear inclined portions 42b, 42b extend obliquely upwardly from rear ends of the horizontal portions 42a, 42a. The rear inclined portions 42b, 42b have trailing ends thereof connected to the sub-frames 60, 60. Each of the lower pipes 42, 42 is formed by bending a single steel pipe.

Each of the pair of left and right sub-frames 60, 60 is connected to a boundary between each of the horizontal portions 42a, 42a and the rear inclined portions 42b, 42b of the lower pipes 42, 42 via a bracket 71. A final gear case for the rear wheels 3 is supported between the sub-frames 60, 60.

A pair of left and right rear sub-frames 44, 44 is disposed between the sub-frames 60, 60 and the rear inclined portions 42b, 42b of the lower pipes 42, 42. Upper arm support portions 64, 64, lower arm support portions 65, 65, and a shock absorber support portion 66 supporting upper arms 61 (FIG. 2), lower arms 62 (FIG. 2), and a rear shock absorber 63 (FIG. 1) constituting the rear suspension 59 are disposed at the rear sub-frames 44, 44 and the sub-frames 60, 60. The upper arm support portions 64, 64, the lower arm support portions 65, 65, and the shock absorber support portion 66 support the components of the rear suspension 59.

Referring to FIG. 1, a pair of left and right front frames 46, 46 is disposed between the upper pipes 41, 41 and the lower pipes 42, 42 at the front portion of the vehicle body. The front frames 46, 46 extend rearwardly along the vehicle body from points near the front ends of the upper pipes 41, 41. Upper arm support portions 54, 54, lower arm support portions 55, 55, and shock absorber support portions 56, 56 supporting upper arms 51 (FIG. 2), lower arms 52 (FIG. 2), and front shock absorbers 53 (FIG. 1) constituting the front suspension 50 are disposed at the front frames 46, 46, the horizontal portions 42a, 42a of the lower pipes 42, 42, and the front inclined portions 41a, 41a of the upper pipes 41, 41. The upper arm support portions 54, 54, the lower arm support portions 55, 55, and the shock absorber support portions 56, 56 support the components of the front suspension 50. In accordance with the embodiment of the present invention, the shock absorber support portions 56, 56 are formed on the cross member 4f disposed across the front inclined portions 41a, 41a of the upper pipes 41, 41.

The front frames 46, 46 are bent at bends 46a rearward of the upper arm support portions 54, 54. Starting with the bends 46a, the front frames 46, 46 are extended obliquely downwardly and connected to the horizontal portions 42a, 42a of the lower pipes 42, 42. A pair of left and right down tubes (also referred to as "front upper frames") 47, 47 extending downwardly from the left and right upper pipes 41, 41 is connected across the bends 46a of the front frames 46, 46 and the upper pipes 41, 41 (front inclined portions 41a, 41a). In addition, a pair of left and right front lower frames 48, 48 extending from the left and right lower pipes 42, 42 are connected across the bends 46a, 46a and the lower pipes 42, 42. These members thereby form a truss structure to enhance the frame stiffness at the front. The down tube 47 and the upper pipe 41 are joined together via a bracket 49 that is a plate member having a substantially triangular shape as shown in FIG. 1. The bracket 49 increases a joining area to thereby enhance the connection strength between the down tube 47 and the upper pipe 41.

A radiator grille 80 is fitted to the pair of left and right down tubes 47, 47. Referring to FIG. 3, the radiator grille 80 extends between the down tubes 47, 47, the steering shaft 27, and the radiator 25, appropriately protecting a front surface of the radiator 25. The radiator grille 80 is formed from a pair of right and left radiator grilles 80R, 80L having a shape symmetrical with each other. The radiator grille 80R covers the right front surface of the radiator 25, while the radiator grille 80L covers the left front surface of the radiator 25. To avoid duplicate descriptions, only the radiator grille 80R will be described in detail below.

Figure 4:
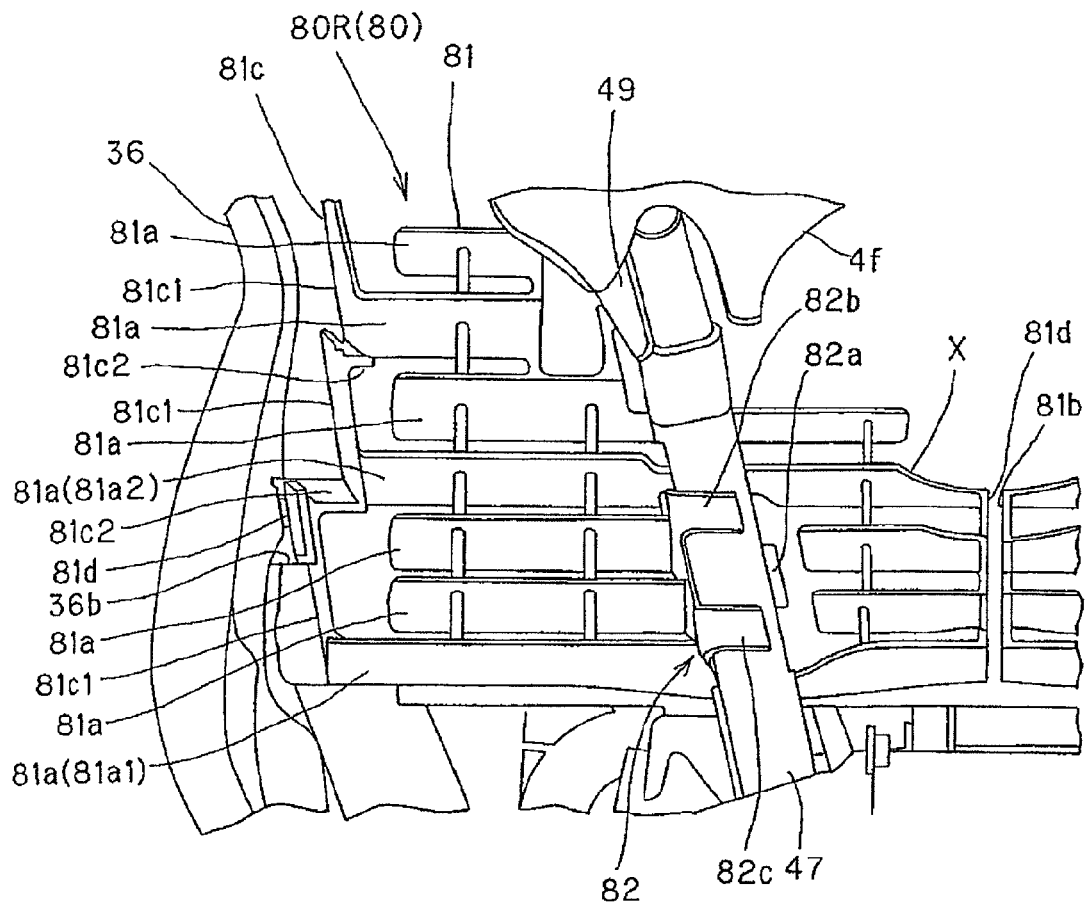
FIG. 4 is a front view showing a radiator grille and surrounding parts.
Figure 5:
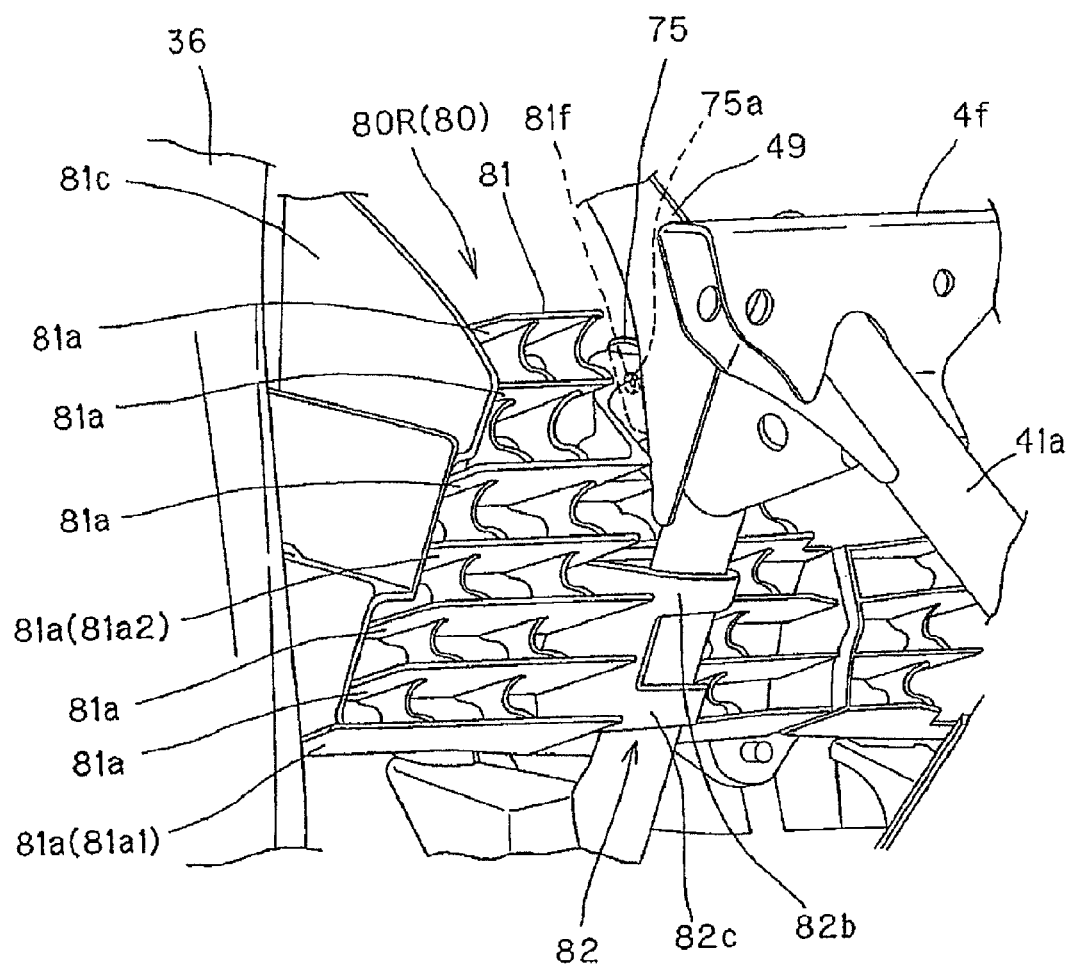
FIG. 5 is a perspective view showing the radiator grille and surrounding parts.

FIG. 4 is a view showing the radiator grille 80R and surrounding parts as viewed from the front of the vehicle body. FIG. 5 is a view showing the radiator grille 80R as viewed from an obliquely forward direction of the vehicle body.

Referring to FIGS. 4 and 5, the radiator grille 80R includes a grille main body 81 and a tab (holder) 82. The grille main body 81 is disposed between the right front surface of the radiator 25 and the down tube 47. The tab 82 extends forwardly from the grille main body 81 to hold the down tube (round pipe frame) 47. The grille main body 81 and the tab 82 are formed as an integral part by molding a resin material.

The grille main body 81 includes a plurality of crosswise plates 81a and left and right vertical plates 81b, 81c. The crosswise plates 81a are connected together at given intervals in a vertical direction. The vertical plates 81b, 81c connect together the crosswise plates 81a. Several lower crosswise plates 81a (four according to the embodiment of the present invention) are formed to have a length about half the width of the radiator 25. The plate members upper than these crosswise plates 81a (three according to the embodiment of the present invention) are formed to have a length that is shorter in a stepwise fashion. The bottommost plate member (bottommost crosswise plate 81a1) and an intermediate plate member (intermediate crosswise plate 81a2) have both ends thereof connected to the left and right vertical plates 81b, 81c. The crosswise plates 81a upper than the intermediate crosswise plate 81a2 are disposed closer to a side of the vertical plate 81c outboard the vehicle body.

More specifically, the abovementioned two crosswise plates 81a (the bottommost crosswise plate 81a1 and the intermediate crosswise plate 81a2) and the left and right vertical plates 81b, 81c form a four-way frame structure, so that a good general stiffness of the grille main body 81 can be ensured. Further, connecting the bottommost crosswise plate 81a1 and the intermediate crosswise plate 81a2 with other crosswise plates 81a achieves good support stiffness for other crosswise plates 81a.

The plurality of crosswise plates 81a including the bottommost crosswise plate 81a1 and the intermediate crosswise plate 81a2 cover an area encompassing an entire lower region of the right-hand half of the radiator 25 and an outside of the vehicle body. More specifically, the plurality of crosswise plates 81a do not cover a center upper region of the radiator 25, so that an escape X is formed that avoids interference with the steering shaft 27.

Referring to FIG. 5, each of the plurality of crosswise plates 81a is disposed at an angle inclined upwardly toward the front. This arrangement allows the crosswise plates 81a to effectively shield mud and sand directed toward the radiator 25 from a downward direction of the vehicle body. Mud and the like can therefore be prevented from sticking to the radiator 25. Looking from the forward direction of the vehicle body, on the other hand, there is a wide spacing between each pair of the plurality of crosswise plates 81a. This allows a sufficient amount of wind from the forward direction of the vehicle body to flow into the radiator 25 through the spaces between each pair of the plurality of crosswise plates 81a.

The left and right vertical plates 81b, 81c of the grille main body 81 are formed as follows. More specifically, the vertical plate 81b closer to the center of the vehicle body is formed into a short vertical plate shape so as not to interfere with the steering shaft 27. The vertical plate 81c on the outboard side of the vehicle body (right-hand side of the vehicle body) is formed into a long vertical plate shape covering the entire vertical length of the radiator 25 on an outer end of the vehicle body.

The vertical plate 81c on the outboard side of the vehicle body is formed into a bent plate shape having an inclined plate portion 81c1 and a horizontal plate portion 81c2 alternately repeated. More specifically, in a front view, the inclined plate portion 81c1 is inclined obliquely upwardly. The horizontal plate portion 81c2 is bent from an upper end of the inclined plate portion 81c1 to extend substantially horizontally toward the center of the vehicle body. Another inclined plate portion 81c1 is inclined obliquely upwardly from an end of the horizontal plate portion 81c2. This makes for a greater modulus of section, as compared with a simple flat plate shape, making the vertical plate 81c highly stiff.

The tab 82 of the radiator grille 80R extends forwardly from a lower portion substantially at the center of the width direction of the grille main body 81. The tab 82 has a leading end including a plurality of sub-tabs 82a, 82b, and 82c formed thereon for clamping the down tubes 47 (right down tube 47) on both sides of the steering shaft 27.

Figure 6A:
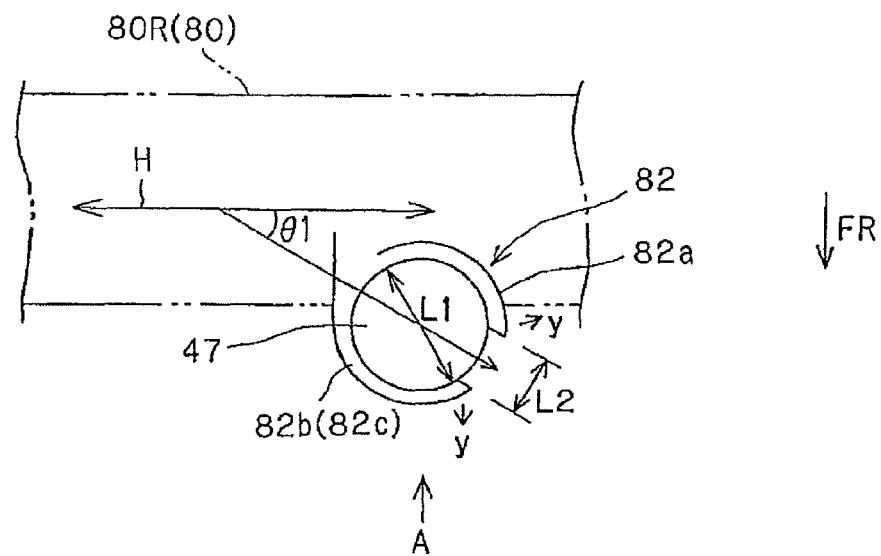
FIG. 6(*a*) is a plan view showing a tab of the radiator grille and surrounding parts.
Figure 6B:
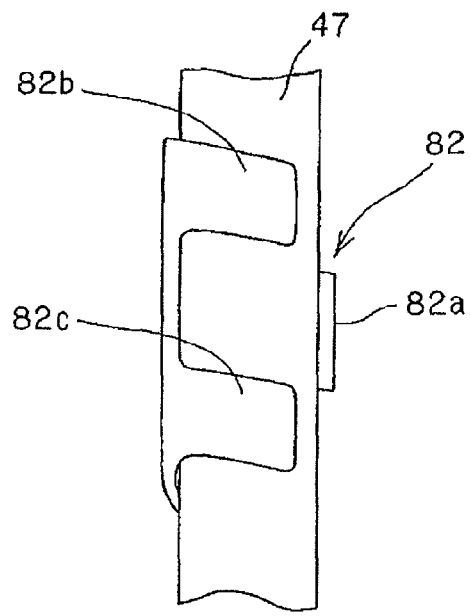

FIG. 6(a) is a plan view showing the tab 82 and surrounding parts. FIG. 6(b) is a view on arrow A of FIG. 6(a). Referring to FIGS. 6(a) and 6(b), the inner sub-tab 82a extends along a surface on the inside in the vehicle width direction from a backside of the down tube 47. The pair of upper and lower outer sub-tabs 82b and 82c extends along a surface of the down tube 47 on the outside in the vehicle width. A gap L2 smaller than a diameter L1 of the down tube 47 is formed between a leading end of the inner sub-tab 82a and a leading end of the outer sub-tab 82b (82c).

The foregoing arrangement achieves the following. More specifically, when the gap L2 of the tab 82 is pressed against the down tube 47 in a condition, in which the tab 82 is yet to be mounted on the down tube 47, the leading end of each of the sub-tabs 82a, 82b, and 82c is elastically deformed to be open outwardly as shown by arrows y, y in FIG. 6(a), so that the down tube 47 is inserted in the sub-tabs 82a, 82b, and 82c. The down tube 47 is then held in position by an elastic force of the tab 82.

Referring to FIG. 5, when the tab 82 of the radiator grille 80R is fitted over the down tube 47 as described above, the radiator grille 80R needs to be obliquely inserted into a space between the down tube 47 and the side cover 36, because the side cover 36 is located sideways the down tube 47. In the arrangement according to the embodiment of the present invention, referring to FIG. 6(a), the gap L2 in the tab 82 is formed at a position inclined at an angle θ1 (an angle equal to, or less than, 90 degrees) toward the front of the vehicle body relative to the width direction of the radiator grille 80R. When the radiator grille 80R is inserted obliquely, the foregoing arrangement allows the gap L2 in the tab 82 to face the side of the down tube 47, which makes it easy to hook the tab 82 onto the down tube 47.

The arrangement according to the embodiment of the present invention includes a first lock structure connecting the radiator grille 80R with the side cover 36 and a second lock structure connecting the radiator grille 80R with the vehicle body frame 4 when the radiator grille 80R is rotated toward the inside of the side cover 36 about the down tube 47 after the radiator grille 80R is inserted obliquely and the tab 82 is hooked onto the down tube 47.

Figure 7:
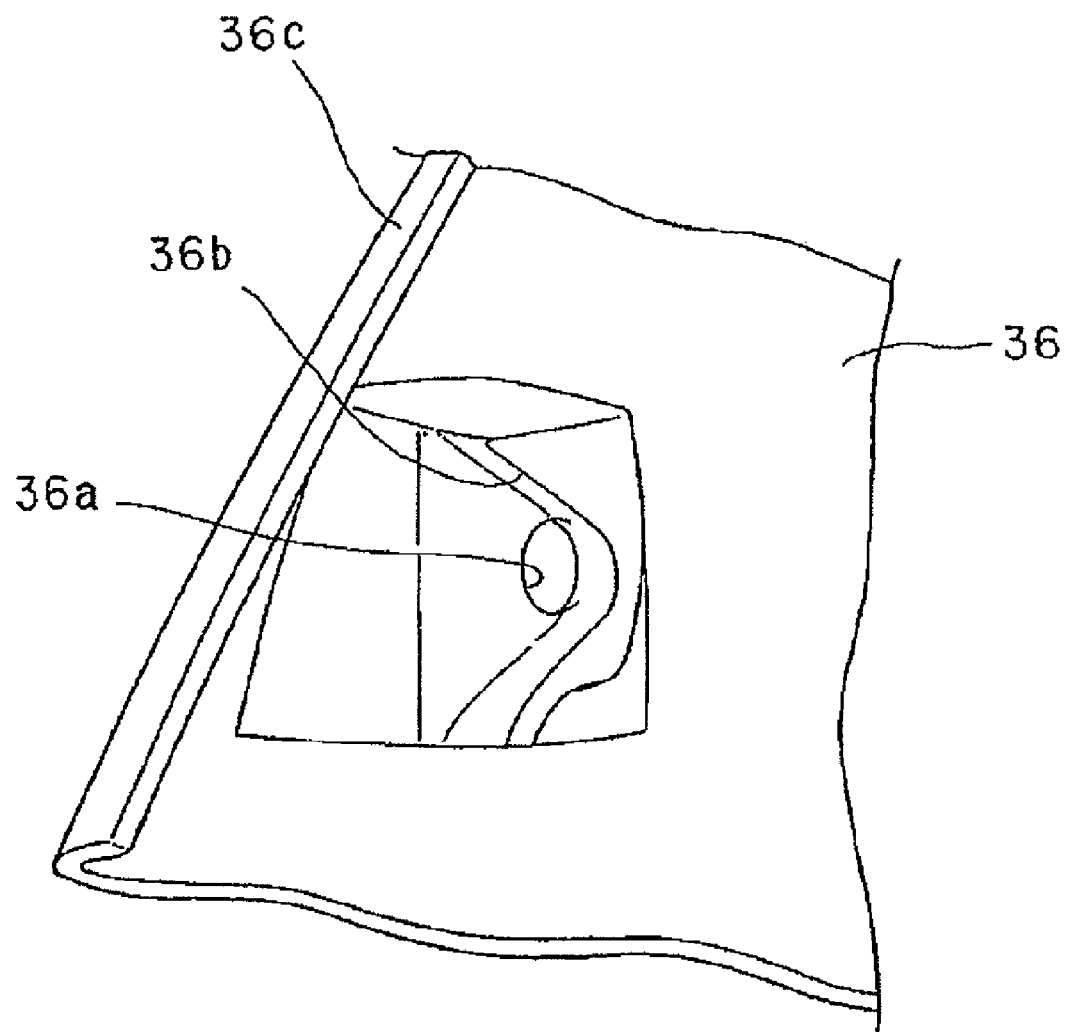
FIG. 7 is a view showing an inside of a side cover.

The first lock structure will be described in detail below. The vertical plate 81c on the outboard side in the vehicle width direction of the radiator grille 80R (on the right-hand side of the vehicle body) includes a first protrusion (support portion) 81d (FIG. 4) integrally formed therewith. The first protrusion 81d protrudes toward the outboard side in the vehicle width direction (toward the side of the side cover 36). Referring to FIG. 7, the side cover 36, on the other hand, includes a recess 36a formed therein. When the radiator grille 80R is hooked onto the down tube 47 and rotated, the first protrusion 81d fits into the recess 36a.

An area surrounding the recess 36a in the side cover 36 includes a substantially U-shaped groove (hereinafter referred to as "guide groove") 36b formed therein. The guide groove 36b protrudes toward the inboard side in the vehicle width direction, excepting an area toward the front of the vehicle body. The guide groove 36b is thus open to the front of the vehicle body.

When the radiator grille 80R is rotated and moved into the inside of the side cover 36 with the tab 82 hooked onto the down tube 47, the first protrusion 81d of the radiator grille 80R fits into the guide groove 36b. As the first protrusion 81d is guided along the guide groove 36b into the recess 36a, the side cover 36 elastically deforms so that the first protrusion 81d fits into the recess 36a. The position of the first protrusion 81d can be automatically adjusted so that the first protrusion 81d fits into the recess 36a. More specifically, the position of the radiator grille 80R is automatically fine-adjusted (fine-adjustment of height according to the embodiment of the present invention). An operator for installing the radiator grille 80R can therefore easily connect the radiator grille 80R with the side cover 36. Referring again to FIG. 4, the first protrusion 81d is formed at substantially the same height as the tab 82 and the first protrusion 81d and the tab 82 support both sides of the radiator grille 80R. It is to be noted that the side cover 36 includes a fold-back portion 36c formed along a front portion thereof. The fold-back portion 36c helps improve bending strength of the side cover 36, to thereby improve supporting strength for the radiator grille 80R.

The second lock structure will be described in detail below. The radiator grille 80R includes a second protrusion (support portion) 81f (FIG. 5) integrally formed therewith on the inboard side in the vehicle width direction. The second protrusion 81f protrudes toward the inboard side in the vehicle width direction. The vehicle body frame 4, on the other hand, includes a flange 75 having an opening hole (opening) 75a, in which the second protrusion 81f fits when the radiator grille 80R is hooked onto the down tube 47 and rotated.

The flange 75 is disposed at the bracket 49 connecting the down tube 47 with the upper pipe 41. The second protrusion 81f disposed at an upper portion substantially at the center in the width direction of the radiator grille 80R is connected to the flange 75. The second protrusion 81f fits into the opening hole 75a in the flange 75 at the same position at which the first protrusion 81d fits into the recess 36a.

Referring to FIG. 4, the radiator grille 80R is connected to the vehicle body frame 4 (the down tube 47 and the bracket 49) and the vehicle body cover 32 (the side cover 36) at three different points of the tab 82. The first protrusion 81d is disposed substantially at the same height as the tab 82. The second protrusion 81f is disposed at a point substantially upwardly of the tab 82. This arrangement ensures sufficient support strength for restricting movement of the radiator grille 80R caused by vehicle vibration.

As described heretofore, according to the embodiment of the present invention, when the radiator grille 80 is obliquely inserted from the side of the vehicle body into the space between the down tubes 47 extending vertically on both sides of the steering shaft 27 and the side cover 36, the tab (holder) 82 of the radiator grille 80 is hooked onto the down tube 47. When the radiator grille 80 is then rotated so that the radiator grille 80 faces sideways about the down tube 47, the radiator grille 80 is fixed and supported at three points by being connected to the side cover 36 and the flange 75 extending from the vehicle body frame 4. In this case, the radiator grille 80 is rotated through only a small angle of about several tens of degrees, over which the radiator grille 80 faces sideways from an oblique position.

More specifically, an operator for installing the radiator grille 80 can complete the installation of the radiator grille 80 through a simple procedure of inserting the radiator grille 80 obliquely from the side of the vehicle body to rotatably support the radiator grille 80 on the down tube 47 and then rotating the radiator grille 80 through about several tens of degrees.

Accordingly, the radiator grille 80 can be installed easily in a space that restricts the degree of freedom in adjusting the position of the radiator grille 80, because the radiator grille 80 extends across the down tubes 47, 47, the steering shaft 27, and the radiator 25.

In the embodiment of the present invention, the radiator grille 80 is formed of the pair of right radiator grille 80R and left radiator grille 80L and each of the right radiator grille 80R and the left radiator grille 80L being mounted individually to a corresponding one of the pair of left and right down tubes 47, 47. Consequently, the space for rotating the radiator grille 80 required for mounting the radiator grille 80 can be made small and each of the right radiator grille 80R and the left radiator grille 80L can be rotated and mounted easily within the narrow space available between the down tubes 47, 47, the steering shaft 27, and the radiator 25.

When a gear ratio of the transmission is to be changed in the ATV vehicle 1, the shift pedal 11 disposed, as shown in FIG. 2, at the center on the left of the vehicle body is operated. This effects a gearshift into a gear position of any of the 1st speed to 5th speed, and a reverse. To select the reverse position, referring to FIG. 1, a reverse assist lever 15, disposed downward of the handlebar 30 at the front of vehicle body, is operated and, in that condition, the shift pedal 11 is operated to select the reverse position.

Figure 8:
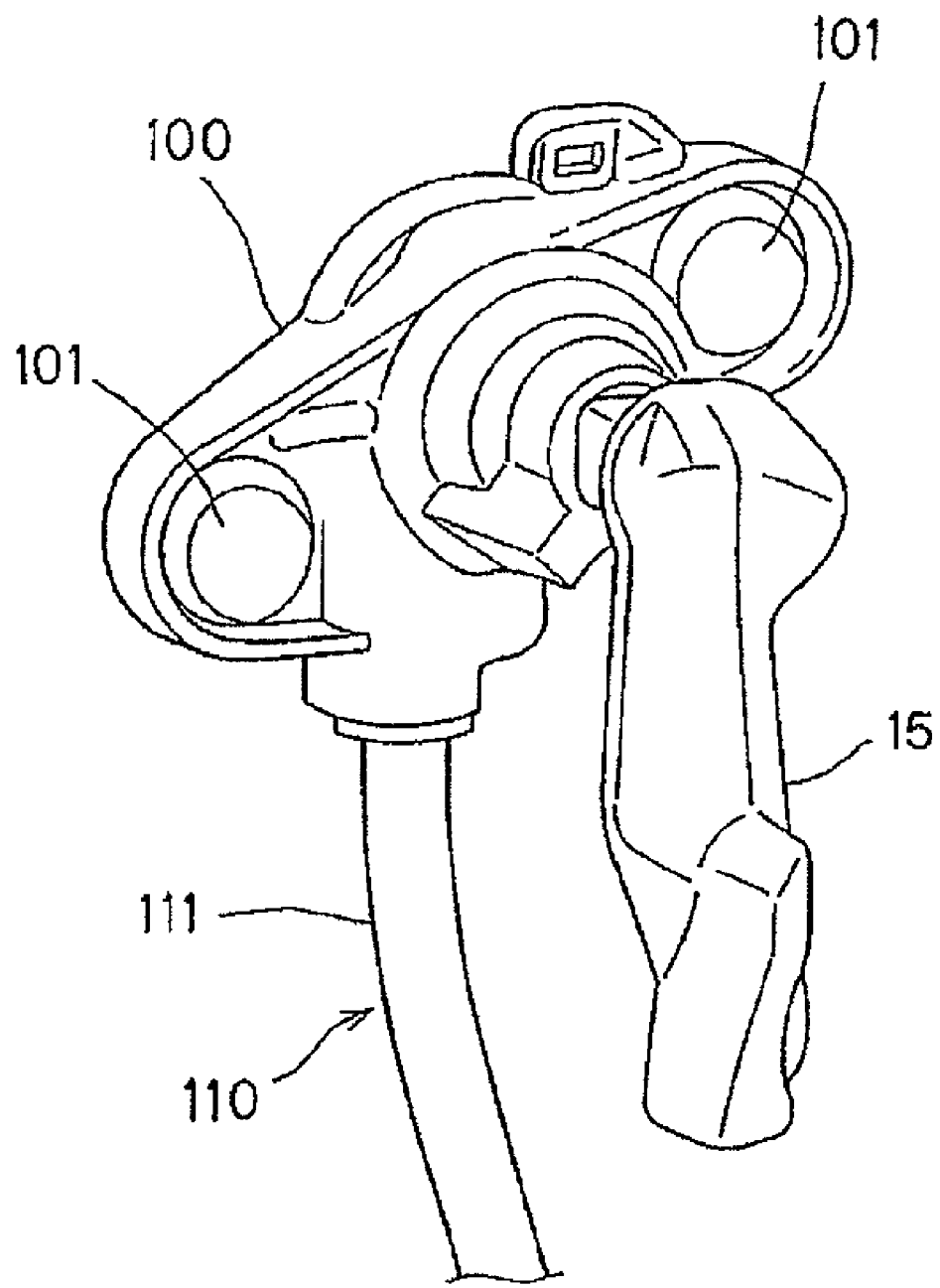
FIG. 8 is a view showing a reverse assist lever and a lever support mechanism.
Figure 9:
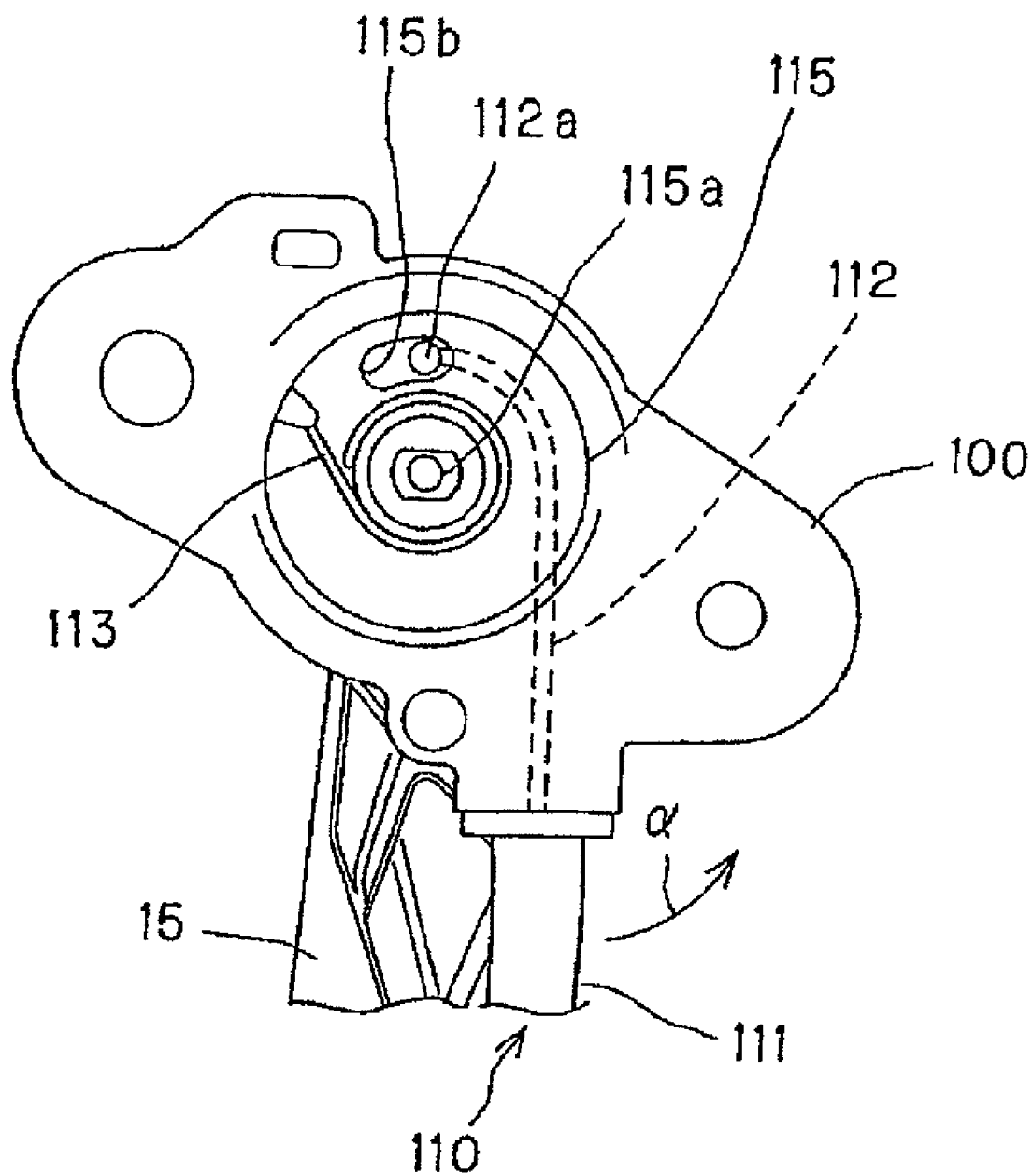
FIG. 9 is a view showing an internal construction of the lever support mechanism.

FIG. 8 is a view showing the reverse assist lever 15 and a lever support mechanism 100. FIG. 9 is a view showing an internal construction of the lever support mechanism 100.

Referring to FIG. 8, the lever support mechanism 100 is connected to the vehicle body frame 4 by way of a pair of left and right screws 101, 101. The lever support mechanism 100 rotatably supports the reverse assist lever (hereinafter referred to as "lever") 15 in a sideways position. One end of a wire 110 for a reverse lock release is connected to the lever support mechanism 100. The wire 110 includes an outer tube 111 and an inner wire 112 passing through the outer tube 111. A take-up mechanism and an urge spring 113 are disposed inside the lever support mechanism 100. The take-up mechanism takes up the inner wire 112 according to rotation of the lever 15. The urge spring 113 urges the lever 15 toward a position of reverse lock (hereinafter, "reverse lock position"; a 6:00 o'clock position clockwise according to the embodiment of the present invention).

Referring to FIG. 8, a wire drum 115 having a relatively large diameter is rotatably supported on the lever support mechanism 100. The wire drum 115 has a central axis 115*a* connected to one end of the lever 15, allowing the lever 15 and the wire drum 115 to be integrally rotatable. The wire drum 115 has a slit 115*b* extending along a circumferential direction of the wire drum 115. A pin (cylindrical metal part) 112*a*, disposed on one end of the inner wire 112, is retained in the slit 115*b* to secure the one end of the inner wire 112. Retaining the pin 112*a* in the slit 115*b* allows the pin 112*a* to be held, while being movable along the circumferential direction of the wire drum 115. Should the inner wire 112 stretch, the pin 112*a* moves in the slit 115*b* for the amount of stretch, suppressing any slack in the inner wire 112.

In the above arrangement, when the wire drum 115 is operated via the lever 15 in an operating direction (in a direction in FIG. 9), more specifically, when an occupant (rider) operating the lever 15 raises the lever 15 to the front, the wire drum 115 takes up the inner wire 112. When the lever 15 is thereafter released, the urge spring 113 causes the wire drum 115 to be rotated in an opposite direction (in a direction opposite the α direction in FIG. 9). The lever 15 is thereby automatically returned to the reverse lock position, while the inner wire 112 is spooled out.

Figure 10:
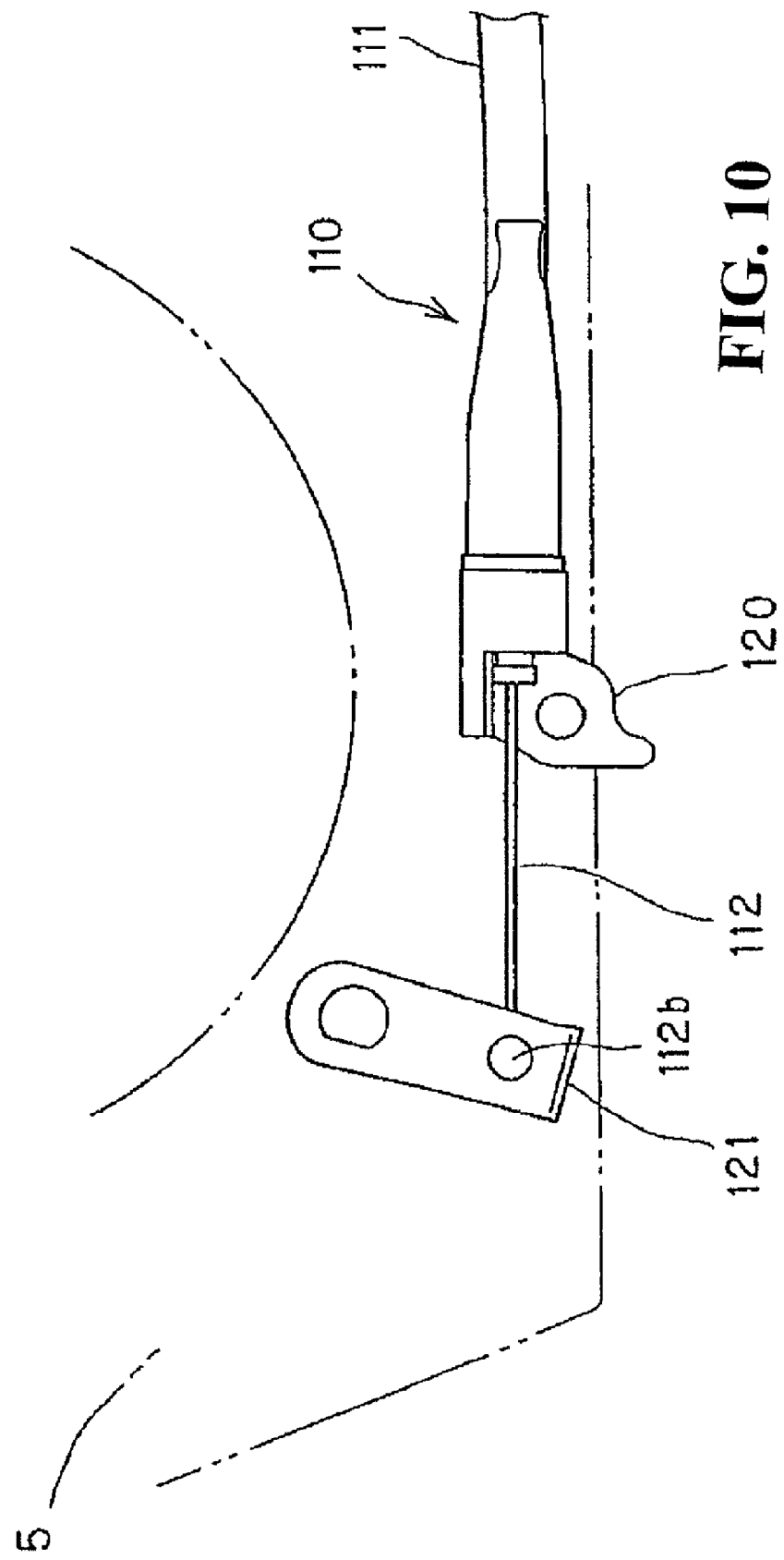
FIG. 10 is a view showing an end of a wire extending from the lever support mechanism and surrounding parts.

Referring to FIG. 1, the wire 110 is routed downwardly of the vehicle body from the lever support mechanism 100 and then toward the rear of the vehicle body. Referring to FIG. 10, the outer tube 111 has one end thereof supported on a side of the engine 5 via a bracket 120.

The inner wire 112 withdrawn from the one end of the outer tube 111 is connected via a pin 112*b* to one end of a reverse lock release member 121 disposed rotatably (pivotally movably) on the side of the engine 5. The position of the reverse lock release member 121 shown in FIG. 10 corresponds to the reverse lock position. Reverse lock is released when the reverse lock release member 121 is pivotally moved toward the front of the vehicle body by the inner wire 112.

If a wire is used to release the reverse lock, an adjustment mechanism is generally required for adjusting play in the wire. In accordance with the embodiment of the present invention, the wire drum 115 has a large diameter to provide allowance for a wire take-up amount, thereby eliminating the need for the adjustment mechanism.

More specifically, in the arrangement according to the embodiment of the present invention, an amount of operation (an operating angle) of the lever 15 required for releasing the reverse lock is set to an appropriate amount (e.g. about 45 degrees) through which the rider can easily operate. Further, the wire drum 115 is adapted to have a diameter such that, when the lever 15 is operated through the appropriate amount, the inner wire 112 is taken up to make up for any stretch therein. It is to be noted herein that the amount of take-up of the inner wire to make up for any stretch therein includes a wire mounting error, in addition to a stretch of the wire occurring with time.

In the arrangement according to the embodiment of the present invention, one end of the lever 15 in a sideways position is connected to the central axis 115*a* of the wire drum 115 and the lever 15 is raised when to operate. This allows the lever 15 to be easily adapted to have a longer length to ensure an appropriate operating force, avoiding a situation, in which the lever requires a greater operating force for its short length.

More specifically, the arrangement according to the embodiment of the present invention achieves operability by providing an appropriate balance between the operating amount and the operating force. The arrangement further eliminates the need for an adjustment mechanism, reducing the number of parts used.

Figure 11:
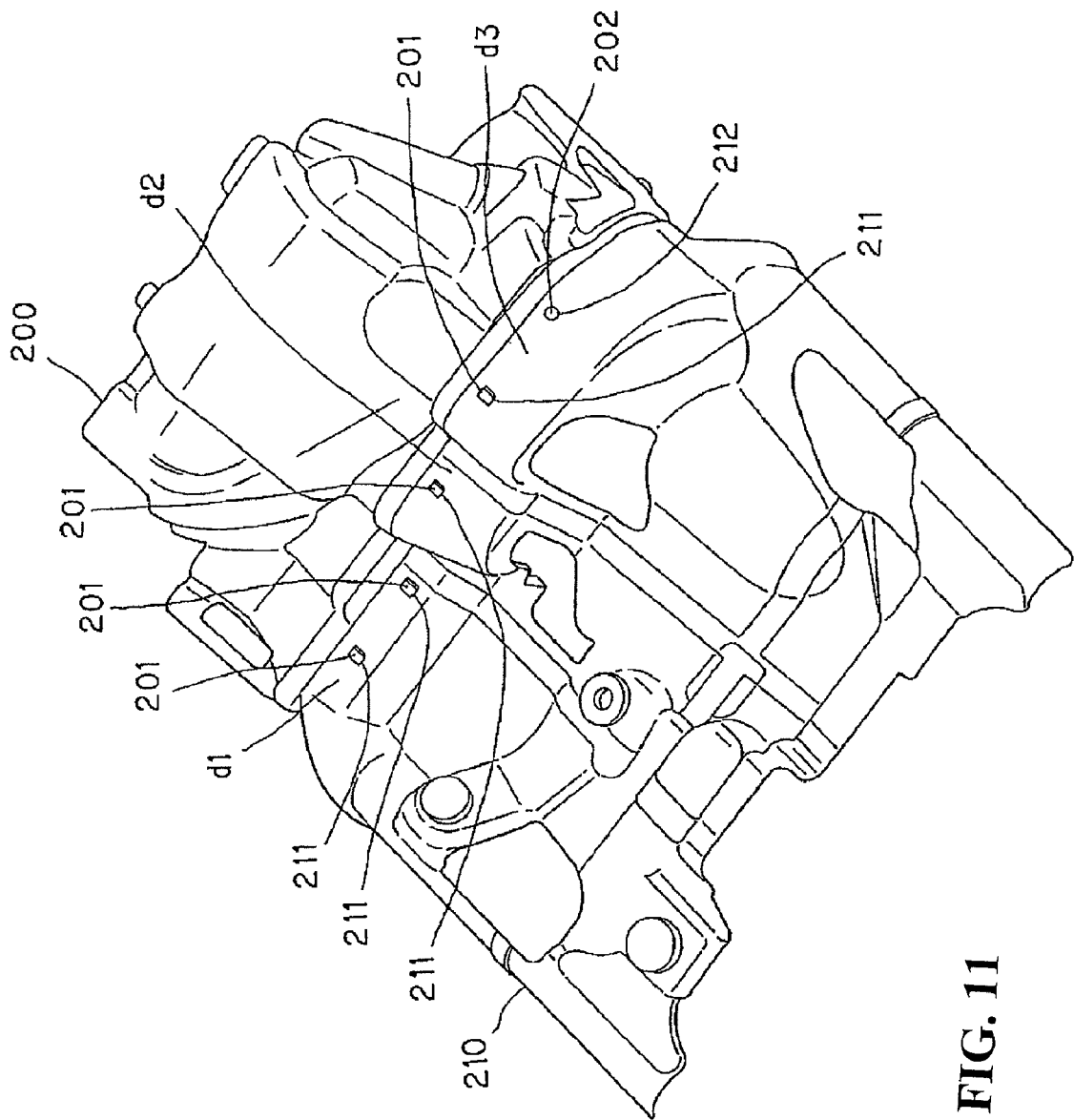
FIG. 11 is a view showing a tank underside cover and a seat underside cover.

Referring to FIG. 11, in the ATV vehicle 1, a tank underside cover 200 is disposed at the intermediate portions 41*b*, 41*b* (see FIG. 1) of the upper pipes 41, 41 so as to bridge the two intermediate portions 41*b*, 41*b* and a seat underside cover 210 is disposed at the horizontally extending portions 60*a*, 60*a* of the sub-frames 60, 60. The tank underside cover 200 is integrally molded from a resin or the like. The tank underside cover 200 is disposed under the fuel tank 28 to shield heat from the engine 5 that would otherwise be transmitted to the fuel tank 28. The seat underside cover 210, formed from rubber or other shock absorbing material, shuts off heat transmitted to the seat 29, reduces vibration, or prevents mud and the like from sticking to a backside of the seat 29. Referring to FIG. 11, the tank underside cover 200 is connected to the seat underside cover 210 as follows. More specifically, the tank underside cover 200 includes a plurality of (four according to the embodiment of the present invention) tabs 201 formed thereon at given intervals along a rear edge of the tank underside cover 200. The seat underside cover 210, on the other hand, includes a plurality of holes 211 formed therein at given intervals along a front edge of the seat underside cover 210. The front edge of the seat underside cover 210 is placed over the rear edge of the tank underside cover 200, so that the tabs 201 are locked into corresponding ones of the holes 211. It should be noted that a protrusion 202 formed in the direction of an array of the tabs 201 is a cylindrical column that fits into a circular hole 212 formed in the seat underside cover 210, so that the tank underside cover 200 can be positioned correctly relative to the seat underside cover 210 at their respective connection positions.

Figure 12A:
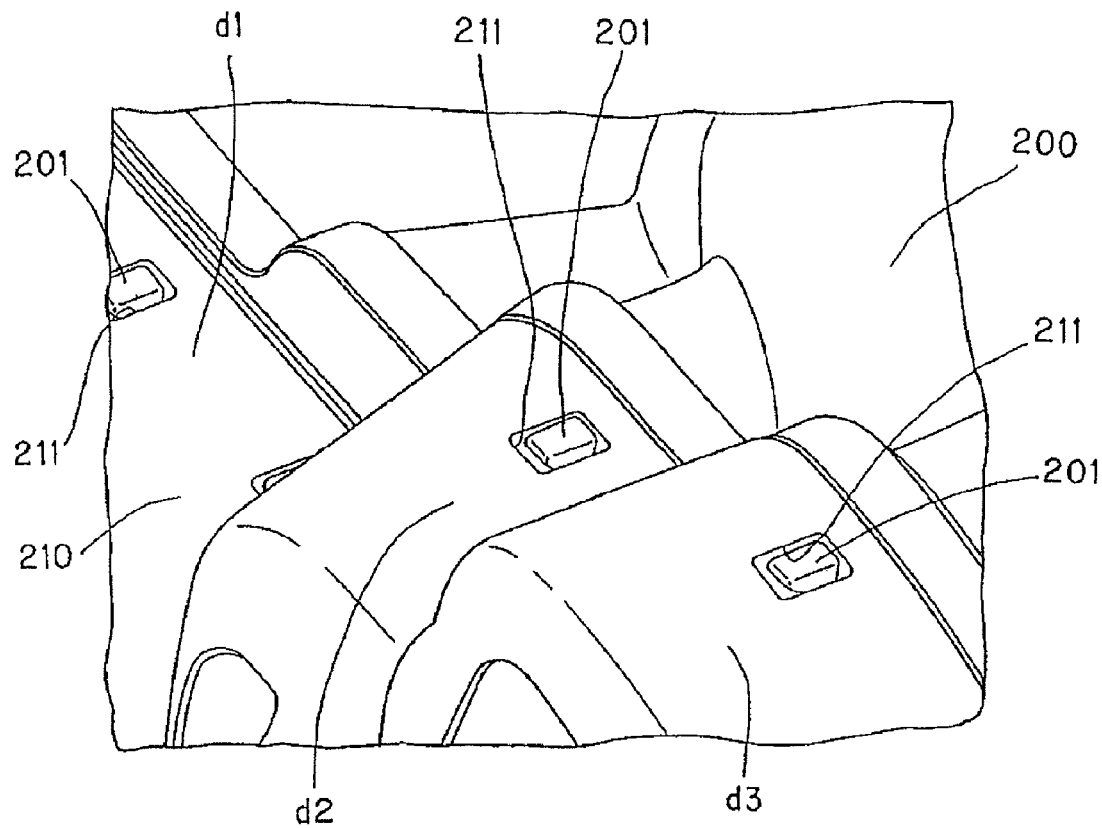
FIG. 12(*a*) is a view showing a connection portion between the tank underside cover and the seat underside cover.
Figure 12B:
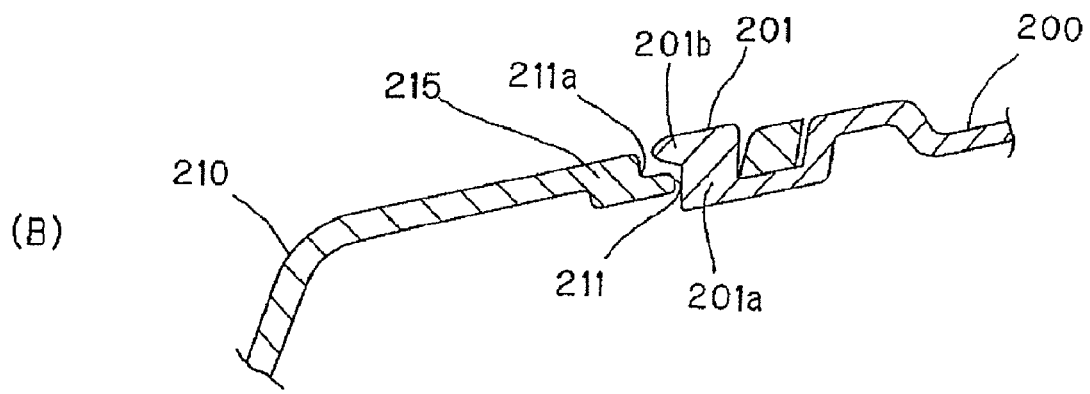

FIG. 12(*a*) is a perspective view showing a connection portion between the tank underside cover 200 and the seat underside cover 210. FIG. 12(*b*) is a side cross-sectional view showing the connection portion between the tank underside cover 200 and the seat underside cover 210. Referring to FIGS. 11 and 12(*a*), the tank underside cover 200 and the seat underside cover 210 are formed into corresponding irregular shapes according to components formed on top or beneath the corresponding covers. Steps d1, d2, and d3 are formed on each of the edges of the covers 200 and 210. The plurality of tabs 201 and the plurality of holes 211 are assigned for the corresponding one of the steps d1, d2, and d3. Referring to FIG. 12(*b*), the tab 201 of the tank underside cover 200 is substantially L-shaped in its cross section, integrating a thick-wall base 201*a* with a leading end 201*b* protruding toward the rear in the vehicle body above the base 201*a*. The hole 211 in the seat underside cover 210 is formed at a thick-wall portion 215 of the cover 210 and includes a step 211*a*, at which the leading end 201*b* of tab 201 can be hooked.

When the tank underside cover 200 is to be connected to the seat underside cover 210, the seat underside cover 210 is pressed toward the tank underside cover 200 so that the tab 201 fits into the hole 211. The hole 211 in the seat underside cover 210 is then widened by the tab 201 and the tab 201 fits into the hole 211, so that the tab 201 engages with the step 211*a* of the hole 211. When the covers 200 and 210 are to be disengaged from each other, the seat underside cover 210 is raised while being pulled toward the rear of the vehicle body. This widens the hole 211 in the seat underside cover 210, so that the tab 201 can be easily removed from the hole 211.

As described above, in accordance with the embodiment of the present invention, the tab 201 of the tank underside cover 200 is adapted to have a thick-wall, substantially L-shaped cross section and the tab 201 has the leading end 201*b* protruding toward the rear of the vehicle body so as to be hooked at the hole 211 in the seat underside cover 210. As compared with an arrangement having a thin-wall tab 201, greater stiffness can be provided for tab 201. Accordingly, it is less likely that the tabs 201 will break during removal and reinstallation of the covers 200 and 210. When the covers 200 and 210 are connected together, the tabs 201, which are nicely accommodated in the holes 211, do not protrude outwardly. The connection portion thus has a flush top surface, eliminating the possibility that the tabs 201 contact any other members. The seat underside cover 210 has the thick-wall portion 215 on the edge thereof, the thick-wall portion 215 having a wall thickness thicker than any other parts of the seat underside cover 210. Further, the hole 211 is formed in this thick-wall portion 215. This allows the step 211a to be formed in the hole 211, facilitating connection with the tab 201.

The present invention has been described with reference to the foregoing embodiment that is only illustrative and is not to be duly limited to the illustrative embodiment set forth herein. For example, in the foregoing illustrative embodiment of the present invention, the radiator grille 80 is locked onto the side covers 36, 36 such that the first protrusion 81d disposed on the radiator grille 80 fits into the recess 36a in the side cover 36. The locking structure is not limited to the foregoing; rather, the radiator grille 80 may have a recess and the side cover 36 may have a protrusion that fits into the recess of the radiator grille 80. The locking structure between the radiator grille 80 and the flange 75 is not limited to the foregoing arrangement and others may be applicable.

In the illustrative embodiment of the present invention, the radiator grille 80 is mounted rotatably about the down tubes 47 extending vertically on both sides of the steering shaft 27. The mounting method is not limited to this; rather, the radiator grille 80 may be rotatably mounted on any part of the vehicle body frame 4 other than the down tubes 47.

In the embodiment of the present invention described heretofore, the radiator grille 80 has been described to be fixed to the down tube 47, the side cover 36, and the flange 75. The radiator grille 80 may, instead, be fixed to another part of the vehicle body frame 4 or another part of the vehicle body cover 32. If the radiator grille 80 is sufficiently secured only by the vehicle body cover 32, it may be omitted to secure the radiator grille 80 onto the vehicle body frame 4. Alternately, if the radiator grille 80 is sufficiently secured only by the vehicle body frame 4, then it may be omitted to secure the radiator grille 80 onto the vehicle body cover 32. In addition, in the embodiment of the present invention described above, the radiator grille 80 has been described to be dividable into the left and right halves. The configuration is not limited to this and the left and right halves may be integrated with each other. Further, the embodiment of the present invention has been described to be applied to the four-wheel saddle-riding type vehicle. However, the embodiment of the present invention may be applicable to a radiator grille mounting structure in various other types of vehicles including a three-wheel saddle-riding type vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A radiator grille mounting structure for a vehicle comprising:
    an engine;
    a radiator disposed on a vehicle body frame; and
    a radiator grille disposed forward of the radiator;
    wherein the radiator grille is mounted on a part of the vehicle body frame, the radiator grille is rotated about the part of the vehicle body frame, and a support portion included in the radiator grille is connected to a vehicle body cover,
    wherein the radiator grille includes a pair of left and right halves which are disposed adjacent to each other in a lateral direction of the vehicle.

2. The radiator grille mounting structure according to claim 1,
    wherein the part of the vehicle body frame includes a pair of frames extending vertically on both sides of a steering shaft for steering front wheels, and
    the radiator grille is fitted to the frames.

3. The radiator grille mounting structure according to claim 2, wherein, each of the left and right halves of the radiator grille is independently attached to a corresponding one of the pair of frames.

4. The radiator grille mounting structure according to claim 2, wherein the radiator grille extends across the vehicle body frame and the radiator.

5. The radiator grille mounting structure according to claim 1,
    wherein the vehicle body cover includes a recess disposed on an inside thereof, and
    a protrusion of the radiator grille is fitted into the recess when the radiator grille is rotated.

6. The radiator grille mounting structure according to claim 2,
    wherein the vehicle body cover includes a recess disposed on an inside thereof, and
    a protrusion of the radiator grille is fitted into the recess when the radiator grille is rotated.

7. The radiator grille mounting structure according to claim 3,
    wherein the vehicle body cover includes a recess disposed on an inside thereof, and
    a protrusion of the radiator grille is fitted into the recess when the radiator grille is rotated.

8. The radiator grille mounting structure according to claim 4,
    wherein the vehicle body cover includes a recess disposed on an inside thereof, and
    a protrusion of the radiator grille is fitted into the recess when the radiator grille is rotated.

9. The radiator grille mounting structure according to claim 5,
    wherein the recess in the vehicle body cover is open to a front side of a vehicle body, and
    the protrusion of the radiator grille is guided along a guide groove open to the front side into the recess.

10. The radiator grille mounting structure according to claim 6,
    wherein the recess in the vehicle body cover is open to a front side of a vehicle body, and
    the protrusion of the radiator grille is guided along a guide groove open to the front side into the recess.

11. The radiator grille mounting structure according to claim 7,
    wherein the recess in the vehicle body cover is open to a front side of a vehicle body, and
    the protrusion of the radiator grille is guided along a guide groove open to the front side into the recess.

12. The radiator grille mounting structure according to claim 8, wherein the recess in the vehicle body cover is open to a front side of a vehicle body, and the protrusion of the radiator grille is guided along a guide groove open to the front side into the recess.

13. The radiator grille mounting structure according to claim 1, wherein, when the radiator grille is rotated about the vehicle body frame, the radiator grille is connected to a distal portion of the vehicle body frame.

14. The radiator grille mounting structure according to claim 2, wherein, when the radiator grille is rotated about the vehicle body frame, the radiator grille is connected to a distal portion of the vehicle body frame.

15. The radiator grille mounting structure according to claim 3, wherein, when the radiator grille is rotated about the vehicle body frame, the radiator grille is connected to a distal portion of the vehicle body frame.

16. The radiator grille mounting structure according to claim 4, wherein, when the radiator grille is rotated about the vehicle body frame, the radiator grille is connected to a distal portion of the vehicle body frame.

17. The radiator grille mounting structure according to claim 5, wherein, when the radiator grille is rotated about the vehicle body frame, the radiator grille is connected to a distal portion of the vehicle body frame.

18. The radiator grille mounting structure according to claim 13, wherein the distal portion of the vehicle body frame includes a flange having an opening, and the protrusion on the radiator grille is fitted into the opening in the flange.

19. A radiator grille mounting structure adapted to be used with a vehicle comprising:

a radiator grille adapted to be mounted on a vehicle frame;

a support portion formed on the radiator grille, wherein the radiator grille is mounted on the vehicle frame with the radiator grille being rotated about a part of the vehicle frame and the support portion included in the radiator grille is connected to a vehicle body cover wherein the part of the vehicle body frame includes a pair of frames extending vertically on both sides of a steering shaft for steering front wheels, and the radiator grille is fitted to the frames, wherein the radiator grille includes a pair of left and right halves, each being independently attached to a corresponding one of the pair of frames.

20. A radiator grille mounting structure for a vehicle comprising:

an engine;

a radiator disposed on a vehicle body frame; and a radiator grille disposed forward of the radiator;

wherein the radiator grille is mounted on a part of the vehicle body frame, the radiator grille is rotated about the part of the vehicle body frame, and a support portion included in the radiator grille is connected to a vehicle body cover, wherein the vehicle body cover includes a recess disposed on an inside thereof, and a protrusion of the radiator grille is fitted into the recess when the radiator grille is rotated.

* * * * *